June 3, 1969
R. L. DERBYSHIRE ET AL  3,448,182
METHOD FOR MAKING HEAT-SHRINKABLE CAP
Filed Nov. 10, 1965
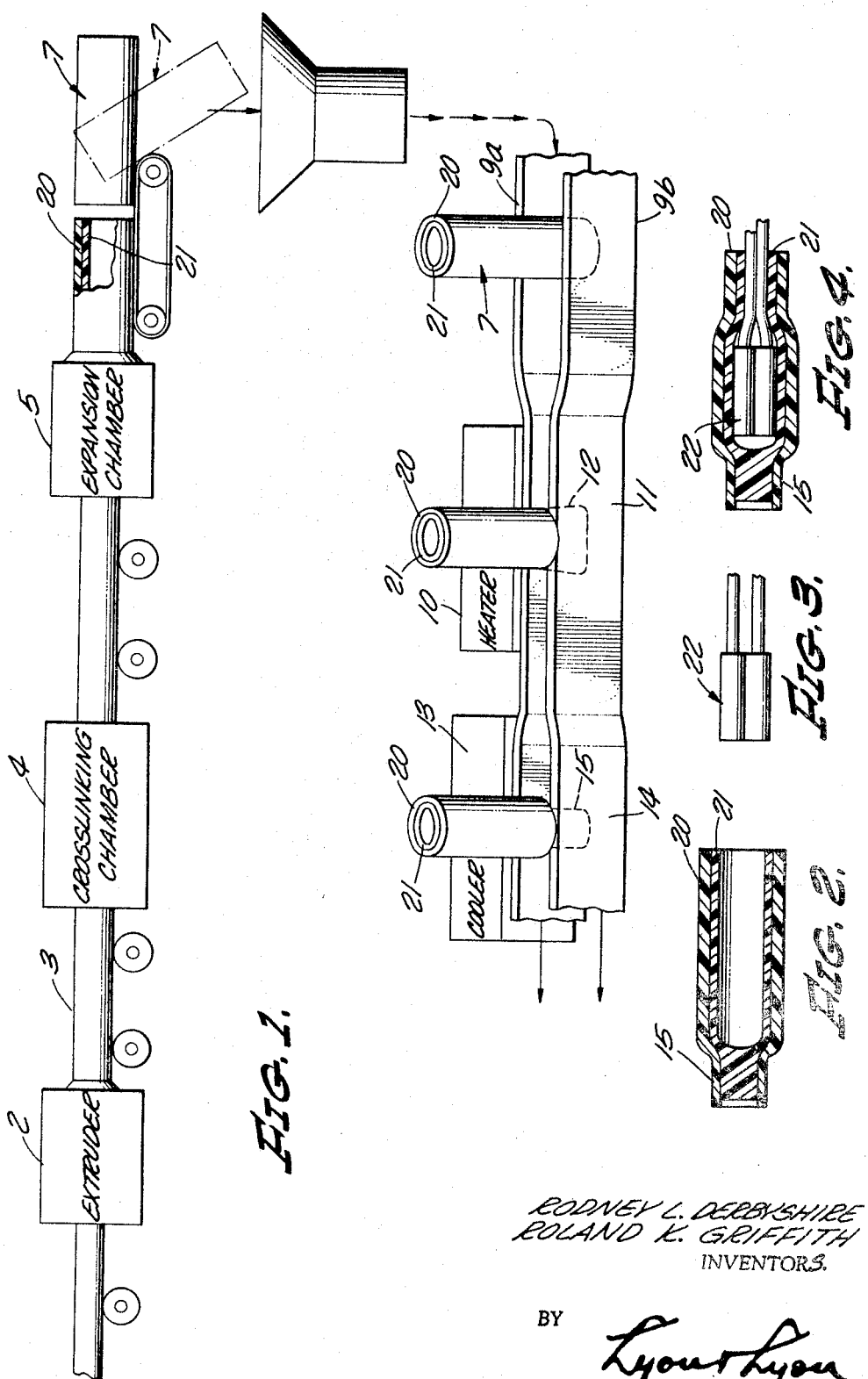
RODNEY L. DERBYSHIRE
ROLAND K. GRIFFITH
INVENTORS.
BY Lyon Lyon
ATTORNEYS United States Patent Office 3,448,182
Patented June 3, 1969

3,448,182
METHOD FOR MAKING HEAT-
SHRINKABLE CAP
Rodney L. Derbyshire, Menlo Park, and Roland K. Griffith, Redwood City, Calif., assignors to Raychem Corp., Redwood City, Calif., a corporation of California
Filed Nov. 10, 1965, Ser. No. 507,163
Int. Cl. B29c 27/12
U.S. Cl. 264—22                        10 Claims

ABSTRACT OF THE DISCLOSURE

Heat-shrinkable end caps are prepared by forming a dual walled tube of polymeric material, the outer wall comprising an infusible elastic memory material and the inner wall comprising a fusible thermoplastic polymer, expanding and setting the tube under conditions to produce a heat-shrinkable tube, applying heat and pressure to one end of said tube whereby the end of the tube is crimped and the inner wall of plastic material is caused to melt and flow thus sealing the end of the tube and cooling the tube to obtain a heat recoverable end cap which will not reopen at its end when heat is applied to cause the cap to heat recover.

---

This invention relates to the production of heat-recoverable articles and has particular reference to a process for producing heat-shrinkable plastic articles in tubular form, but sealed at one end.

Heat-shrinkable articles, comprising plastic tubing sealed at one end and having the property of elastic memory (sometimes referred to as plastic memory), have found extensive use as so-called "end caps" for encapsulating cable and wire terminations, splices and the like. The caps are provided in varying lengths and diameters, but are dimensionally oversized with respect to the object to be encapsulated for easy application to the object, followed by the application of heat to shrink the cap tightly about the object.

Present methods of manufacturing end caps have the disadvantage of a relatively high unit cost of manufacture. Because the heat recoverable plastic tubing from which the end caps are fabricated is a crosslinked polymer, processes for converting tubing of this crosslinked material into caps having a sealed end have employed expensive dies and molds. Thus, the variations in diameter and length of the cap can only be accomplished by extensive and costly retooling. A primary object of the present invention is to provide an improved process which is easily adaptable to making caps of varying diameter and length.

A further object of this invetion is to provide a continuous process for the production of heat-shrinkable end caps.

Other objects and advantages of the present invention it is believed will be readily apparent from the following detailed description of the preferred embodiments thereof, when read in connection with accompanying drawings.

In the drawings:

FIGURE 1 is a diagrammatic side view, partly in section, illustrating the steps utilized in carrying out a preferred embodiment of the process of the present invention.

FIGURE 2 is a sectional view of an end cap article produced in accordance with the present invention.

FIGURE 3 is a side view of an electrical wire splice.

FIGURE 4 is a side view in section of an assembled end cap and electrical connection.

The heat recoverable plastic materials used for the end caps of this invention are conventional crosslinked elastic memory materials. These materials can be sealed by the application of heat and pressure and cooled while under pressure, but do not remain sealed when reheated. Thus, the present invention contemplates forming a tube of two concentric layers. The outer layer of this dual walled tubing is a heat recoverable plastic of the type commonly used for end caps. The inner layer or wall is comprised of a heat sealable polymer. Thus, when a crimping force is applied to the end of a section of tubing, the inner wall will become sealed at one end forming a cap. A properly formed seal of this type will not reopen upon heating. In carrying out the present invention, the following steps are performed in the order set forth:

(1) A dual walled tube, the outer wall comprising an infusible, crosslinked polymeric material having elastic memory characteristics and the inner wall comprising a fusible polymeric material is first formed. A method of producing such a tube is disclosed in the copending and commonly assigned application of Cook, Ser. No. 228,300 filed Oct. 4, 1962, which is incorporated herein by reference. Although two separated tubes having these characteristics may be bonded togther to form a dual walled tube, the preferred method of making the dual walled tube is subjecting a tube to a crosslinking treatment which will crosslink the outer wall to form an infusible memory material but will leave the inner wall in a fusible state. This may be accomplished by selectively crosslinking the outer surface of a uniform tube of polymeric material or by crosslinking a tube having an outer wall which comprises a material having much greater susceptibility to crosslinking than the inner wall. A preferred method of forming the dual walled tube is set forth below.

(a) Thermoplastic material having low susceptibility to crosslinking is extruded or otherwise formed into a tube having the desired inside diameter for the sealed cap.

(b) An outer jacket of thermoplastic material which is highly susceptible to crosslinking is extruded over the tubing in tight adherence to the tubing to form a dual walled tube.

(2) The dual walled thermoplastic tubing is then subjected to a crosslinking treatment, either by means of irradiation at a dose sufficient to achieve the degree of crosslinking of the outer wall desired, or by chemical crosslinking. Chemical crosslinking may be achieved by the inclusion of a chemical cross-linking agent (such as a peroxide in the case of polyolefins) in the polymeric material of the outer wall, designed to initiate crosslinking upon the controlled application of heat at this stage of the process, in a manner readily understood by those skilled in the art. As is well-known, upon cross-linking, the polymeric material will not melt when heated above the crystalline melting temperature or thermoplastic temperature thereof, but will behave as an elastomer, being capable of stretching or distorting in a rubber like manner. Thus, as is well-known, such materials are eminently suited for the production of elastic memory articles, simply by cooling the material to a temperature below the crystalline melting temperature while it is held in the stretched or distorted condition. When so cooled, the material will retain the distorted configuration until it is reheated above the crystalline melting temperature, whereupon it will return to its original configuration unless mechanically restrained. The inner layer wall, however, which has a low susceptibility to crosslinking, will become crosslinked to only a very slight degree and thus will melt when heated above the crystalline melting temperature or thermoplastic temperature thereof.

The outer wall material may comprise any crosslinkable polymeric material. Among the various polymeric materials which may be used to accomplish the objects of the present invention are polyethylene, ethylene copolymers, polypropylene, nylon, fluorinated ethylene propylene, polyvinylchloride, polyvinylidene fluoride, and acrylic polymers. Non-crystalline polymeric materials exhibiting the property of plastic or elastic memory, such as polyurethane, ionomers, etc., could also be used in practicing the present invention. In general, all polymeric materials capable of being crosslinked by irradiation or chemical means and capable of forming an elastic memory material may be employed to form the outer wall 5. In addition, very high molecular weight materials which have strength above the crystalline melting temperature and which are capable of possessing elastic memory may also be used.

Furthermore, combinations of materials may be used to form the article of the present invention. It is essential that the combined materials be capable of forming such an intimate bond with each other so that an essentially homogeneous article may be produced. For example, polyethylene and an ethylene vinyl acetate copolymer may be used together.

The inner wall must comprise a material which will remain fusible after the dual walled tube has been given a treatment to crosslink the outer wall. Thus, the important characteristic of inner wall material is that it has relatively low susceptibility to crosslinking with respect to the outer wall. The susceptibility to crosslinking can be controlled by many methods known to the art.

If irradiation is used to crosslink, the lower susceptibility of the inner wall to crosslinking may be due solely to its greater distance from the source of radiation and the shielding effect of the outer wall. Thus, a tube having an inner wall and outer wall of the identical material (actually such a tube might have only one discernible wall) might still have an outer wall of higher susceptibility to cross-linking than the inner wall within the meaning of the terms as used in this description.

If the outer wall were polyethylene, for example, the inner wall might comprise another polymer such as an ethylene vinyl acetate copolymer. However, polymers from the same monomer may be tailored to have a different susceptibility to crosslinking. One such method is to control the molecular weight and/or molecular weight distribution such that irradiation does not crosslink the inner wall to the point where it is infusible. For example, it is known that both molecular weight and molecular weight distribution have a vast influence on the dose-to-infusibility of polyethylene, as disclosed by Lawton et al., Ind. Eng. Chem., 46, 1703 (1954). Thus, the desired crosslinking properties of the inner and outer wall may be achieved by manipulation of these molecular weight characteristics when polyethylene is used. Practical limits, expressed in terms of melt index, on the molecular weight of polyethylene are as follows: relatively infusible portion about 1.5 or lower; relatively fusible portion about 20 or higher.

Antirads may also be used to control infusibility. These materials, when incorporated into polymers functions by chemical means to prevent crosslinking of the polymers, e.g., by free radical reactions. Some thermal anti-oxidants for olefin polymers function as strong antirads. Thus, the incorporation of a thermal anti-oxidant in the inner wall serves the dual function of preventing this portion from reaching the infusibility point during irradiation and also serves to protect the polymer against thermal degradation. Of course, other materials which are not anti-oxidants function as antirads. An example of a thermal anti-oxidant antirad for polyolefins is 4,4'-thiobis-(6-tert-butyl-m-cresol). Other examples are: 4,4'-methylenebis-(2-tert-butylphenol); 2,6-ditert-butylphenol; 4,4'-butylidenebis-(6-tert-butyl-m-cresol); 2,5 - di(t-amyl) hydroquinone. Examples of antirads which are not anti-oxidants are: pentabromophenol, naphthylene, copper stearate.

The portion of the tube having high susceptibility to crosslinking is, in general, produced in a manner similar to the inner wall except that the outer wall comprises a material which reaches the infusibility point at radiation doses insufficient to cause the inner wall to lose its fusibility. Thus, a material having a higher molecular weight than the inner wall may be used, or crosslinking agents such as a polymerizable comonomers may be added to the outer wall. Examples of such crosslinking agents are: divinyl benzene, polybutadiene, allyl methacrylate, divinyl succinate, ethylene glycol diacrylate, diallyl fumarate, triallyl phosphate, triallyl cyanurate. These crosslinking agents promote crosslinking at low radiation doses in the outer wall, particularly when polyolefins and polyvinyl halides are used.

The crosslinking of the outer wall may be initiated by chemical means as well as by irradiation. Thus, a peroxide or other free radical generating material may be incorporated in the outer wall. Then, on the application of heat or some other reaction initiator, crosslinking will occur. The chemical crosslinking agent may react with polymer chains to form the crosslink.

It is, of course, also possible to incorporate into the outer wall, the inner wall or both, fillers, flame retardants, etc., as may be desired for a particular purpose.

(3) The crosslinked dual walled tubing is then heated to a temperature above the crystalline temperature and the tubing is expanded to the desired final diameter. This expansion is most advantageously carried out by the creation of a differential in pressure between the inside and outside of the tubing portions, preferably by injecting a gas such as compressed air into the interior of the tubing portions under sufficient pressure to bring about the desired expansion as disclosed in U.S. Patent No. 3,086,242. Other means of expansion would include the reduction in pressure on the outside of the tubing, the injection of a liquid under pressure into the interior of the tubing portions, the initial placing into the extruded tubing or injection into the tubing portions of a chemical or chemicals capable of generating a gas or vapor upon the application of the heat to the tubing, etc. If desired, the dual walled tubing, having its outer layer crosslinked, can be cut into sections which are expanded by various means such as by forcing a mandrel or pin into the section of tubing while it is hot and removing the mandrel or pin after cooling to a temperature sufficient to set the tubing in the expanded condition. The expansion is not necessarily dependent upon the application of heat to a temperature above the crystalline melting temperature, as expansion can be carried out at lower temperatures or even room temperature if the force of expansion is sufficient and if the material is held in the expanded condition for a sufficient length of time.

(4) While the tubing portions are held in the expanded condition, the material is cooled to a temperature sufficient to set the material in the expanded form. Preferably, the tubing is expanded within the confines of a cylinder of heat-conductive material and is immediately cooled upon contact with the cylinder so that the expanded diameter is regulated within reasonably close tolerances.

(5) The expanded dual walled tubing having its outer wall crosslinked is then cut to the desired cap length.

(6) The section of dual walled tubing is formed into a cap by applying heat and pressure to one end of a section of tubing. Upon the application of heat and pressure, the inner wall of tubing at the point of application will melt and flow tending to cause the end of the tubing to become sealed thus forming a cap. The application of heat will also causes the portion of the outer wall of the tubing at the point where the heat is applied to return to its pre-expansion diameter, thus aiding in the closing of one end of the section of tubing. Re-opening of the end of the cap during heat shrinking of the cap is easily avoided by making the cap wall sufficiently thick and using fusible materials having a sufficiently high viscosity at the heat shrinking temperature. Upon the application of sufficient heat and pressure to seal an end of the section of tubing with thermoplastic material from the inner layer and to cause contraction of the outer wall, the cap is cooled. Any suitable manner of applying heat and pressure to an end of the tubing section to form the cap and of subsequently cooling may be used. A preferred method for continuous proudction is to place one end of a section of tubing between two continuous belts which gradually come closer together and are heated at a point where the gap between them is small. Sufficient heat is supplied during the residence time at the narrow gap portion of the belt to soften, deform, and partially recover the outer jacket and to melt and deform the inner wall of the tubing. The belts upon continuing past the heating stage enter a cooling area wherein the formed caps are cooled by the belts.

Referring now to the drawings, the steps in the preferred process are illustrated in FIGURE 1, wherein a tube of thermoplastic material only slightly susceptible to crosslinking enters extruder 2. In the extruder an outer wall 3 of crosslinkable polymer is formed on the inner wall to produce a dual walled tubing having its inner wall only slightly susceptible to crosslinking and its outer wall highly susceptible to crosslinking indicated by 3. The dual walled tubing is then fed through the crosslinking chamber 4, preferably therein exposed to high energy radiation source such as a high energy beam (not shown). The irradiation is carried out in a manner known to those skilled in the art, to insure even radiation on all sides of the outer wall, as well as the correct amount of radiation to provide the desired level of crosslinking in the outer wall.

The dual walled tubing having its outer wall crosslinked is then conveyed to an expansion chamber 5, where it is expanded to the desired diameter.

The expanded dual walled tubing having its outer wall crosslinked is then cut into desired length for the cap and fed by a suitable feeding means between two moving belts, 9a and 9b. The gap between the belts is just slightly smaller than the diameter of the section of tubing 7 so that when the belts move from right to left as indicated, they carry the tubing in that direction also. The gap in the tubing is decreased gradually until it is approximately twice the thickness of the two walls in the area indicated generally as 11. In this area, the belt is heated by a suitable heating means indicated by 10. The combination of pressure on the tubing caused by the narrowing of the gap between the belts and the heat, causes the tubing to become crimped in the area indicated as 12. The heat and crimping action cause the inner non-crosslinked wall of the tubing to soften and flow thus closing one end of the tubing and forming a cap. In this crimping operation, the outer walls of the tubing are pressed so that opposite surfaces are essentially in contact. After the crimping operation, the gap in the belt gradually increases and in this area of the wider gap, designated as 14, the belt is cooled by a suitable cooling means 13. In the cooling area 14, the outer wall will assume its pre-expanded diameter as indicated by 15.

The crimping belts may be made of any material which is strong enough to do the crimping and will act as a suitable heat exchange member. The preferred crimping device is a set of two endless metal or plastic covered metal belts, arranged so as to drive against each other in caterpillar fashion.

The heat recoverable end cap produced by the process of this invention is illustrated in FIGURE 2. FIGURE 2 is a cross-sectional view showing the outer wall 20 which is crosslinked and thus heat recoverable, an inner wall 21 which is made of a plastic having low susceptibility to crosslinking. The material forming the closed end of the cap comprises substantially entirely thermoplastic material used to form the inner wall.

FIGURE 3 illustrates a wire crimp splice 22 which may be covered by the caps of this invention. The cap of FIGURE 2 is merely slipped over the splice shown in FIGURE 3 and then heated causing the outer layer of the cap to return to its original diameter thus forming a tight seal illustrated in FIGURE 4.

The following example further illustrates the process of this invention.

Example 1

A tubing was extruded from low density polyethylene which had a relatively low MW and a melt index of greater than 20 and contained 1% by weight of an anti-oxidant to a core I.D. of .057 inch with a .025 inch wall. This tubing was then passed through a second extrusion step, in which an outer jacket of high density polyethylene which had a relatively high molecular weight, a melt index of less than 1.5 and contained 1% anti-oxidant and 2% triallyl cyanurate was extruded tightly in adherence to the core with a thickness of .015 inch. This tubing was then irradiated by means of an electron beam generator to the nominal dosage of 10 megarads. This tubing was then expanded to an inside diameter of .187 inch by means of an expansion process, such as described in U.S. Patent 3,086,242. The tubing thus formed was then cut into pieces one inch long.

A number of pieces were placed in the bowl of a vibratory feeder and were conveyed by it in single file to a feed station. The feed station was mounted on one end of a modified Doughboy Industries, Model BB Band Sealer. A tripper valve, air cylinder and cams were ranged so as to feed one cut piece at a time into the rubber feed-in of the band sealer. The height and relative position of the parts were set by means of an adjustable stop on which the part sits before and during its placement between the belts. The rubber feed-in belts conveyed the parts until their ends were caught and carried forward by the metal belt. The crimp length and crimp position were set by adjusting the position of the part at the feed-in station.

The metal belt (Teflon coated stainless steel) conveyed the part past heating elements. The belts and heating jaws were arranged so that the belts converged together appropriately as the crimped end heated and deformed, then diverged as the crimp cooled. This allowed the crimp to first be flattened, allowing the inner walls to melt in contact together, and then allowed the crimp area to recover and partially round itself out. This gave a good-appearing cap, in which the crimped end was of much smaller diameter than the expanded remainder of the cap. As the bands diverged, through the heating station, the caps eventually dropped from the bands or were tipped off the bands as the crimp pressure was released.

We claim:

1. A process for the production of heat-shrinkable end caps, comprising the steps of forming a dual walled tube of polymeric material, the outer wall comprising an infusible elastic memory material and the inner wall comprising a fusible thermoplastic polymer by crosslinking the outer wall of a tube having an outer wall of high susceptibility to crosslinking and an inner wall of low susceptibility to crosslinking, expanding and setting the tube under conditions to produce a heat-shrinkable tube, applying heat and pressure to one end of said tube whereby the end of the tube is crimped and the inner wall of thermoplastic material is caused to melt and flow thus sealing said end of the tube, and cooling the tube to obtain a heat recoverable end cap whose end seal will not reopen when the cap is heat recovered.

2. The process of claim 1 wherein the dual walled tube is formed by extruding a wall of thermoplastic material susceptible to crosslinking onto a tube of thermoplastic material having a low susceptibility to crosslinking.

3. The process of claim 1 wherein the crosslinking is carried out by high energy radiation.

4. The process of claim 1 wherein said crosslinking of the outer wall is carried out by chemical means.

5. The process of claim 1 wherein said expanding step is carried out by injection of gas under pressure into the interior of said dual walled tube.

6. A process for the production of heat-shrinkable caps comprising the steps of forming a dual walled tube having an outer wall susceptible to crosslinking and an inner wall of low susceptibility to crosslinking by extruding a layer of thermoplastic material highly susceptible to crosslinking on a tube of thermoplastic material having a low susceptibility to crosslinking, crosslinking said outer wall, expanding said dual walled tube to a final diameter greater than its initial diameter, cooling said tube while holding it in the expanded condition, closing one end of said tube by applying heat and pressure whereby the inner layer of thermoplastic material deforms and seals one end of the tube and the outer crosslinked layer shrinks to its diameter before expansion.

7. The process of claim 6 wherein the thermoplastic material susceptible to crosslinking is polyethylene.

8. The process of claim 6 wherein the thermoplastic material having a low susceptibility to crosslinking is polyethylene having a melt index of at least about 20, and the material having a high susceptibility to crosslinking is polyethylene having a melt index of less than about 1.5.

9. The process of claim 7 wherein the crimping and cooling steps are carried out by placing one end of said tube between opposed continuous belts having a portion wherein the belts are heated and the gap between the belts is approximately twice the wall thickness of the dual walled tube.

10. The process of claim 7 wherein said process is carried out upon a continuous length of tubing and wherein the expanded tubular portions are cut to provide the continuous end caps prior to the crimping step.

References Cited

UNITED STATES PATENTS

| | | | |
|---|---|---|---|
| 2,679,469 | 5/1954 | Bedford. | |
| 2,997,411 | 8/1961 | Woolley | 264—248 X |
| 3,018,189 | 1/1962 | Traver | 117—47 |
| 3,040,385 | 6/1962 | Folta | 264—230 |
| 3,086,242 | 4/1963 | Cook et al. | 264—95 |
| 3,184,358 | 5/1965 | Utz | 156—244 |
| 3,201,503 | 8/1965 | Benning et al. | 264—95 |
| 3,223,761 | 12/1965 | Raley | 264—95 |
| 3,303,243 | 2/1967 | Hughes et al. | 264—94 X |

ROBERT F. WHITE, *Primary Examiner.*

T. J. CARVIS, *Assistant Examiner.*

U.S. Cl. X.R.

264—95, 150, 173, 230